Figure 1:
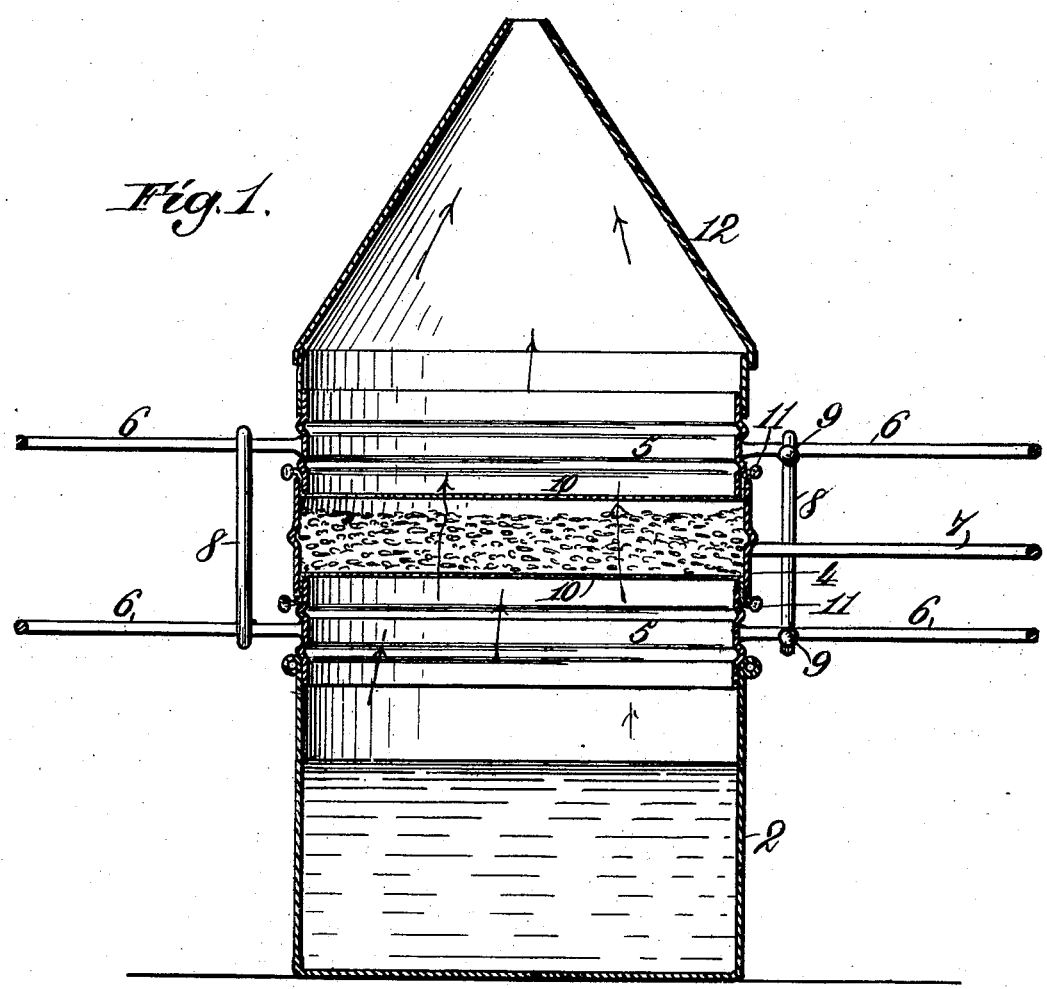

No. 844,512. PATENTED FEB. 19, 1907.
D. GENESE.
APPARATUS FOR TREATING FOOD PRODUCTS.
APPLICATION FILED NOV. 20, 1905.

2 SHEETS—SHEET 1.

Witnesses.
Inventor.
David Genese.
By James L. Norris
Atty

THE NORRIS PETERS CO., WASHINGTON, D. C.

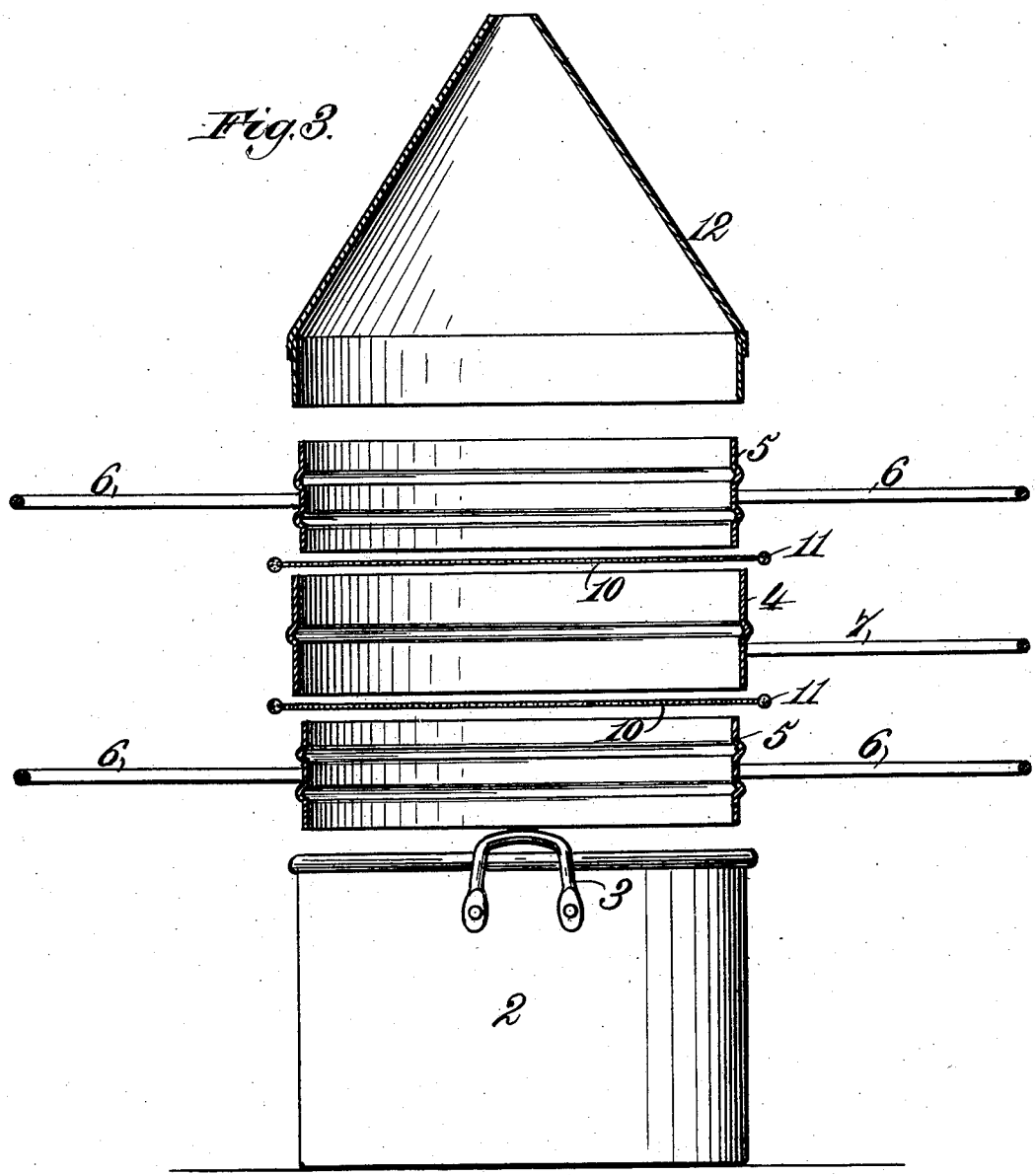

UNITED STATES PATENT OFFICE.

DAVID GENESE, OF BALTIMORE, MARYLAND, ASSIGNOR TO GENESE CEREAL MANUFACTURING CO., OF BALTIMORE, MARYLAND, A CORPORATION OF VIRGINIA.

APPARATUS FOR TREATING FOOD PRODUCTS.

No. 844,512.  Specification of Letters Patent.  Patented Feb. 19, 1907.

Application filed November 20, 1905. Serial No. 288,283.

*To all whom it may concern:*

Be it known that I, DAVID GENESE, a citizen of the United States, residing at Baltimore, in the State of Maryland, have invented new and useful Improvements in Apparatus for Steaming Food Products, of which the following is a specification.

This invention relates to apparatus for steaming food products.

The apparatus is intended especially for treatment of rice foods and other cereals that require direct steam heat to cure them.

I provide a construction wherein I effectually cure or thoroughly cook products in the apparatus without possibility of condensed vapors coming in contact with such products, as in case they did such products would be saturated or soaked and be given a pasty appearance.

The apparatus is of such a construction that its contents can be inspected at any time and that such contents can be thoroughly stirred or agitated without using a spoon or equivalent article for such purpose.

In the drawings accompanying and forming a part of this specification I illustrate in detail a simple form of embodiment of apparatus including my invention, which to enable those skilled in the art to practice said invention I will set forth in detail in the following description, while the novelty of the invention will be included in the claims succeeding said description.

Figure 2:
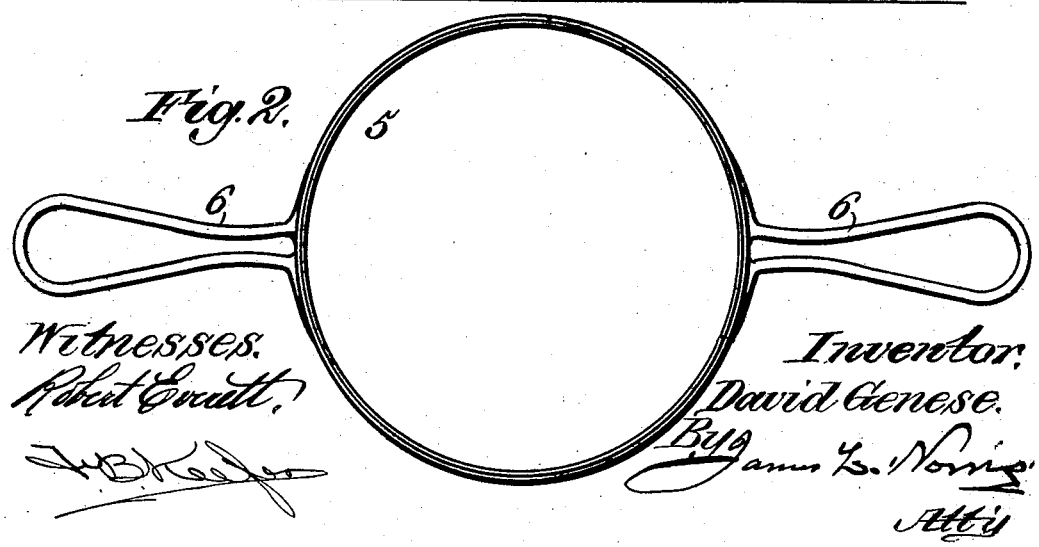

In said drawings, Figure 1 is a vertical central section of my improved apparatus for treating food products. Fig. 2 is a plan view of one of the ring-sections. Fig. 3 is a sectional side elevation showing the parts separated from one another, and Fig. 4 is a detail view of one of the locking devices.

Like reference-numerals refer to like parts throughout the several views.

The apparatus involves in its make-up a steam-chamber in which steam is generated to cure food products located in a suitable cooking-chamber over said steam-chamber. The steam-chamber in the present instance is presented by the space within the vessel 2, represented as being cylindrical, and as having near its upper side handles or ears, as 3, by which it can be easily manipulated. The vessel 2 has an upper open side and is adapted to contain water. By placing the vessel upon a stove this water can be brought to a heat sufficient to generate steam, which will rise from out of the vessel and penetrate the cooking-chamber, to which I have briefly alluded hereinbefore.

Located above the vessel 2 are shown three annular sections—a main annular section 4, and auxiliary sections, each designated by 5. I have termed these sections "annular." They need not, as represented, be of ring form. The auxiliary sections 5 are adapted to fit the opposite sides of the main or intermediate section 4, so as to present when assembled a tubular structure constituting a continuation of the vessel 2. Either section or band 5 is adapted to fit the vessel 2, so that in this way I provide for the reversibility of a cooking-chamber presented in part by the three sections, which, as will be understood, consists of open rings. The three rings have a telescopic relation, and either of the rings 5 is adapted to have a similar relation with respect to the top of the vessel 2. The auxiliary sections 5 are shown as having diametrically opposite handles 6, while the intermediate or main section 4 has a single handle 7. The several handles are of substantially bail or loop form. By providing the handles upon the sections or rings they can be separately handled with facility. In practice I prefer to lock the outer rings 5 together, so that the three rings or sections can be handled, in effect, as a unitary structure. The locking device may be of any suitable character. The one shown is designated by 8, and it is adapted to coöperate with two alined handles 6 and is represented as being of approximately U form. The branches of this locking device 8 terminate in knobs 9, which face each other and which can be passed through two coöperating handles and then moved inward to lock the rings 5 in fixed relation and necessarily to assure the same relation with respect to the intermediate ring 4.

Between the opposite edges of the main section, the ring 4, and the auxiliary sections or rings 5 I interpose foraminous mediums, as 10, which constitute alternately the upper and lower walls of the cooking-chamber to which I have referred, the side wall of said chamber being composed of the ring or section 4. The foraminous mediums 10 I prefer to make of textile fabric, such as canvas. I find textile fabric is more advantageous for my purpose, as there is no possibility of any condensed vapor adhering thereon, which is invariably the case when a screen of wire is used. The two pieces of fabric 10 are of greater diameter than the rings, and they extend over the opposite sides of the main ring and are held firmly in place by the telescopic fit between the main ring and the auxiliary rings—that is to say, the latter hold the two pieces of fabric in place. The two rings 5, as will be understood, are removably associated with the ring 5, so that they can be separated at any time to take off the fabric for any purpose—for example, for cleaning or for removing cured products or for introducing uncured products in the cooking-chamber. The two pieces of fabric 10 are marginally beaded, as at 11, and the beads serve a double purpose. They prevent the pieces of fabric from slipping from place or from sagging, and they also present packings to cover the joints between the rings and prevent the escape of steam therethrough.

As previously explained, the three sections 4 and 5 present, with the fabric, pieces 10 a reversible cooking-chamber adapted to contain cereals, which cooking-chamber can be placed over the vessel 2 in such manner as to permit steam from the vessel to rise through the chamber and cure the cereals. The chamber can be readily reversed by grasping the diametrically opposite handles 6, or the three rings can be collectively shaken to agitate the mass of material in the said cooking-chamber.

When the apparatus is in action, I apply to one of the rings or sections 5 a cap or crown, as 12, and in the present case in a telescopic manner. It will be obvious that the cap when in its operative position is fitted to the upper auxiliary ring 5. This cap is shown as being of substantially conical form and as having a central outlet in its apex for the discharge of steam.

In operation the three rings 4 and 5 will be fitted together, with the pieces of fabric 10 in position, in the manner described and with material to be cured in the space between the two pieces of fabric. The three rings will then be placed over the vessel 2, with the lower ring 5 in telescopic relation with said vessel, after which the cap 12 will be applied to the upper ring 5. Should there be steam in the vessel, such steam will rise therefrom and will pass through the lower piece of fabric 10, through the mass of material on said piece of fabric, then through the upper piece of fabric, and finally to the atmosphere by way of the outlet in the apex of the conical cap 12. The steam is therefore caused to positively pass through the mass of material. There is no possibility of condensation taking place. I provide for a thorough action of steam on both sides of the contents of the apparatus. I provide for the turning of the mass at any moment or for the agitation of the mass. By reason of the construction of the cap 12 in a conical manner the steam is drawn to a central point, so that every part of the mass is permeated by the steam before the latter reaches the atmosphere.

What I claim is—

1. An apparatus of the class described, comprising a vessel, a main annular section, auxiliary annular sections fitted to opposite sides of the main section and each adapted to fit the section, a cap adapted to be fitted to each auxiliary section, and foraminous material at opposite sides of the main annular section and held in place thereto by the auxiliary annular sections, and means for clamping the several annular sections together whereby the same can be bodily reversed.

2. An apparatus of the class described involving a vessel, a main annular section, pieces of textile fabric fitted over the opposite sides of the said annular section and provided with peripheral beads, auxiliary annular sections to telescope the opposite sides of the main annular section and hold the pieces of textile fabric in place, the beads of the latter covering the joints between the sections, and each auxiliary section being adapted to fit the vessel, and a conical cap adapted to fit each auxiliary section, having a steam-outlet in its apex.

3. An apparatus of the class described comprising a vessel, a main annular section, auxiliary annular sections telescopically fitted to opposite sides of the main section and each adapted to fit the vessel, a conical cap adapted to be telescopically fitted to each auxiliary section and having a central steam-outlet in its apex, and foraminous material at opposite sides of the main annular section and held thereto by the telescopic fit between said main annular section and the respective auxiliary annular sections.

4. An apparatus of the class described comprising a vessel, a main annular section, auxiliary annular sections telescopically fitted to opposite sides of the main section and each adapted to fit the vessel, a conical cap adapted to be telescopically fitted to each auxiliary section and having a central steam-outlet in its apex, and foraminous material at opposite sides of the main annular section and held thereto by the telescopic fit between said main annular section and the respective auxiliary annular sections, said auxiliary sections having oppositely-disposed handles and the intermediate main section having a handle.

In testimony whereof I have hereunto set my hand in presence of two subscribing witnesses.

DAVID GENESE.

Witnesses:
HEATH SUTHERLAND,
BERNARD P. VASHON.